United States Patent
Malot

(10) Patent No.: US 7,041,165 B2
(45) Date of Patent: May 9, 2006

(54) METHOD FOR MAKING COLD-PROCESS BITUMINOUS MIX

(75) Inventor: Michel Malot, Saint Eustache la Foret (FR)

(73) Assignee: Totalfinaelf France, Puteaux (FR)

(*) Notice: Subject to any disclaimer, the term of this patent is extended or adjusted under 35 U.S.C. 154(b) by 0 days.

(21) Appl. No.: 10/399,688

(22) PCT Filed: Oct. 23, 2001

(86) PCT No.: PCT/FR01/03290

§ 371 (c)(1),
(2), (4) Date: Oct. 1, 2003

(87) PCT Pub. No.: WO02/34836

PCT Pub. Date: May 2, 2002

(65) Prior Publication Data

US 2004/0216640 A1    Nov. 4, 2004

(30) Foreign Application Priority Data

Oct. 23, 2000  (FR) ................... 00 13519

(51) Int. Cl.
*C09D 195/00*   (2006.01)
*C08L 95/00*    (2006.01)

(52) U.S. Cl. .................. 106/277; 501/60; 501/61
(58) Field of Classification Search ............... 106/277; 524/60, 61
See application file for complete search history.

(56) References Cited

U.S. PATENT DOCUMENTS

| | | | | |
|---|---|---|---|---|
| 2,898,223 A | * | 8/1959 | Detrick .................. | 106/219 |
| 3,928,061 A | * | 12/1975 | Hellsten et al. .......... | 106/284.4 |
| 4,430,127 A | * | 2/1984 | Dalter et al. ............ | 106/284.4 |
| 4,738,996 A | * | 4/1988 | Vonk et al. .............. | 524/59 |
| 5,073,298 A | * | 12/1991 | Gentle et al. ............ | 516/117 |
| 5,776,234 A | * | 7/1998 | Schilling ................ | 516/47 |

FOREIGN PATENT DOCUMENTS

GB    2 255 978 A    11/1992

* cited by examiner

*Primary Examiner*—David Brunsman
(74) *Attorney, Agent, or Firm*—Sughrue Mion, PLLC

(57) ABSTRACT

The invention concerns a method for making cold-process bituminous mixes, using a bitumen-type emulsion in aqueous phase and aggregates. It consists of treating said aggregates with an agent providing hydrophobicity, prior to mixing said emulsion with said aggregates.

39 Claims, No Drawings

METHOD FOR MAKING COLD-PROCESS BITUMINOUS MIX

This disclosure is a 371 filing of PCT/FR01/03290, filed 23 Oct. 2001, which claims priority from, French patent application No. 13519 filed Oct. 23, 2000, the contents of which are incorporated by reference herein The present invention concerns making cold-process bituminous mix, usable in particular in the paving industry, using a bitumen-type emulsion in aqueous phase mixed with aggregates.

In paving technology, bituminous mixes are materials used in the construction and maintenance of paving systems and their surfaces, and for road repair work. They are composed of mineral aggregates, mostly of siliceous nature (flint, quartzite, granite) or silica-calcium, and bituminous binders.

According to the aggregate coating method, these mixes are classified in two categories: hot coating, prepared with materials, with a bituminous type binder, that are raised to relatively high temperatures, and cold coating, achieved by emulsifying the binder in liquid phase with a surfactant, using the mechanical energy (cement mixer, turbine) needed for the dispersion of the binder in fine droplets, and blending with the aggregates at lower temperatures.

From the environmental perspective, cold-process mixes have the important advantage that, during their implementation, they do not produce the emission of fumes, and are therefore quite suitable for urban roadways. They also have great flexibility of use because of the low temperatures required for their application, particularly in locations where it is not possible to have a heating device. During the application of the cold-process composition in paving construction, the breakdown of the emulsion occurs, with elimination of the water and the formation of a continuous adhesive film of the bitumen-type binder on the aggregates.

Emulsions have been used in paving technology for many years and have been constantly improved. The resurgence of interest in cold-process mixing techniques and their new spectrum of application, particularly for paving materials suitable for heavy traffic highways, have led to a better understanding, on the one hand, of the mechanisms of breakdown of the emulsion between the mixing stage, particularly the blending type, and the steps of spreading and compacting, in order to preserve a workability of the mixture compatible with its use, particularly during storage and transport, and on the other hand, the mechanisms of film formation of the emulsion on the aggregates.

The film formation of the bitumen around the aggregates involves four successive steps, the kinetics of which must be controlled:
  the wetting of all the minerals by the emulsion,
  the heteroflocculation of the droplets of bitumen, which establishes the distribution of the bitumen on the mineral surface and which is essential with respect to the continuity of the film,
  the coalescence of the droplets of bitumen, which is the step of destabilization of the emulsion,
  the maturation of the bitumen, corresponding to the molecular rearrangement within the bitumen, which is essential to achieving within a short time, if possible during compacting, the optimal mechanical performances including cohesion.

With cationic emulsions, the use of aggregates that are predominantly calcareous sometimes results in problems of adherence of the bitumen. This is explained by the formation of a friable layer due to the attack of the surface of the aggregate by HCl, and by the excessively quick breakdown of the emulsion following an abrupt increase of the pH.

Moreover, the coalescence should develop progressively in order to give the mix a satisfactory period of workability, while still preserving the ability to develop a strong final cohesion.

An attempt to improve the workability was approached in the patent FR 2,695,664, which describes a method of obtaining dense cold-process mixes, by coating aggregates with an emulsion mixed with a hard bitumen and a soft bitumen, in proportions such that their mixture had the desired final hardness. However, this document does not offer any solution to controlling the speed of breakdown of the emulsion and is not concerned with the evolution of interface phenomena of the aggregates/emulsion system.

Another approach is described in the application EP 896,985, which concerns a method of producing dense mixtures by coating aggregates with a bituminous emulsion comprised of a mixture of a slow-breakdown emulsion and a fast-breakdown emulsion. Unfortunately, this method of producing mixtures requires the use of two emulsions and is therefore more restrictive than the usual method. In addition, it is not concerned with the hydrophobation of the aggregates, and the coalescence kinetics of the bitumen that conditions the rapid increase in cohesion of the mix is not controlled.

Furthermore, the control of the moment of breakdown of an aqueous emulsion of bitumen is described in patent EP 864,611, by the incorporation of an encapsulated breakdown agent, which is released by mechanical action during the compacting. Unfortunately, this method does not allow the interactions between aggregates and emulsion to be limited during the period prior to the compacting.

The Applicant has carried out research that has allowed her to make progress in understanding the breakdown phenomena and the mechanisms governing the film formation of the cold-process mixes, particularly due to the characterization of the interface properties and of the molecular structure of the surfactants used by molecular modeling.

In particular, she has established that, surprisingly, the hydrophobation of all of the mineral surface of the aggregates, before mixing them with the emulsion, by considerably limiting the interactions with the emulsion and therefore the possibilities of breakdown thereof, gives the mix an increased workability from the coating stage to the spreading stage. This hydrophobation is obtained through the use of an appropriate interface agent or dope, composed of polar organic molecules the adsorption of which on the aggregates forms a hydrophobic film, thus modifying the surface condition. This film should preferably be formed as a single layer on the aggregates. The rate of hydrophobation obtained makes it possible to act on the coalescence kinetics and therefore on the speed of breakdown of the emulsion. Moreover, the hydrophobation allows the subsequent coating of the aggregates by the bitumen, irrespective of the nature of said aggregates.

An object of the invention, therefore, is a method for making cold-process bituminous mix, using a bitumen-type emulsion in aqueous phase and aggregates, characterized in that prior to mixing the emulsion with said aggregates, they are treated with a hydrophobation agent.

According to the invention, the hydrophobation agent acts as a modifier of the surface tension of the surface of the aggregates.

In particular, the molecules of the hydrophobation agent form an organic lipophilic film on the surface of the aggregates.

Preferably, the hydrophobation agent is composed of amino acid or alkylamine compounds.

Other compounds, such as those of the water repellent type, or macromolecular surfactant compounds, can also be used.

In particular, the amino acid compounds can be polyalkylamphopolycarboxyglycinates, and especially tallow-amphopolycarboxyglycinates.

Furthermore, the alkylamine compounds can be alkylsulfpolypropylenepolyamines.

Also, the hydrophobation agent for the aggregates can be composed of polyoxyethylenepolyalkyletherphosphate, such as polyoxyethylene oleyl etherphosphate.

More particularly, the hydrophobation agent is used in liquid phase, during the wetting of the aggregates, and preferably in aqueous phase.

In a preferred form of embodiment, the hydrophobation surfactant is introduced at a rate of at least 0.04% by weight with reference to the aggregates.

According to the invention, the bitumen type emulsion is produced from natural bitumen, which is selected from among pure bitumens, fluxed bitumens, and bitumen modified by polymers, and which is dispersed in aqueous phase with an emulsifying agent. Natural bitumen is understood as being the product obtained particularly as the residue from distillation under vacuum of crude oil and the extraction of asphalt from this residue.

Advantageously, the bitumen is a hard grade 50/70 (penetrability at 25° C., measured according to the standard NF The 66-004), which can be acidified in particular by a fatty acid pitch.

The emulsion can also be produced from synthetic binder.

Preferably the bituminous emulsion includes between 60% and 70% by weight of bitumen.

In the method according to the invention, between the step of mixing the emulsion and the aggregates and the step of application by spreading the mixture thus obtained, the duration of workability is more than four hours, preferably at least eight hours, and still more preferably, at least 24 hours.

The Applicant has also established that after the mixture is spread, the mechanical energy used for the compacting, which is an essential step for the densification of the mix, is not enough to cause the complete breakdown of the emulsion, so that this breakdown can advantageously be obtained by adding a coalescence agent to the emulsion. The molecules of the coalescence agent, by modifying the hydrophilic-lipophilic balance at the interface of the phases of the surfactant of the emulsion, cause the breakdown of the water-bitumen interface films and the agglomeration of the droplets in "clusters" on the aggregates. This step contributes to improving the speed of intensification of cohesion of the mix and its resistance to disintegration by water.

The method according to the invention, therefore, encompasses the introduction into the bitumen type emulsion of a coalescence agent.

According to the invention, the coalescence agent is composed of C12 to C14 ethoxylated and propyloxylated amines, C8 to C12 ethoxylated and glycolic alcohols or antifoaming type compounds such as C20 to C30 mineral oils with ethoxylated silicon sites or mixtures of silicon oils and silica.

Preferably, the coalescence agent is introduced at the rate of at least 0.03% by weight with reference to the aggregates, immediately before mixing them with the emulsion. This coalescence agent is introduced into the bituminous emulsion preferably in aqueous phase.

According to the invention, the cold-process bituminous mix composition also includes the introduction of a film-forming agent into the bitumen type emulsion.

In effect, the coalescence of the droplets of bitumen is accompanied by a contraction in volume, corresponding to a more stable thermodynamic equilibrium (formation of clusters), and the action of a film-forming agent becomes necessary to obtain a continuous film of bitumen, which results in better cohesion of the mixture.

More particularly, the film-forming agent can be composed of alkyl polyacrylate, and in particular, ethyl polyacrylate. In a preferred mode of embodiment, it is introduced at a rate of at least 0.12% by weight with reference to the aggregates, prior to mixing. However, the coalescence agent and the film-forming agent can also be introduced after mixing.

The bituminous emulsion is obtained by introducing into the water a common emulsifier or surfactant, such as alkylamine derivatives, mixtures of alkylamidopolyamines and quaternary ammonium salts, or alklypropylenepolyamine compounds such as N tallow-propylenepolyamines.

This type of emulsion is cationic, but it is obvious that the invention also applies to anionic or non-ionic emulsions.

The cold-process bituminous mix composition according to the invention has particularly advantageous application in the paving industry, especially as dense mixes, drainage mixes, thin bitumen concretes (BBM), very thin bitumen concretes (BBTM), ultra-thin bitumen concretes (BBUM), and cold-poured mixes, for construction of underlays or pavement.

However, other industrial applications can be considered.

Preferred methods of implementation of the invention will now be described.

To make cold-process bituminous mixes according to the invention, different formulations of cold-process mixes are made (with compactness of more than 90%), by using aggregates of the Meilleraie type (siliceous porphyric diorites, which can be assimilated in a mixture of $SiO_2/CaO$ 60/40% by weight), with grain size of 0/10.

1. Hydrophobation of the Aggregates

They are hydrophobic the moment they are wetted by an amino acid type additive, which is a tallow-amphopolycarboxyglycinate.

The adsorption of this additive on the aggregates has been examined by determining the surface tensions of the aqueous phases recovered by centrifuging, after the wetting solution has been in contact with the aggregates for one hour. The measurements of surface tension were made with a plate tensiometer at an average temperature of 20° C., but it is possible to use another type of device such as a pendant drop tensiometer.

The line of the curve of the surface tension as a function of the concentration of hydrophobation agent shows a plateau up to a concentration of about 0.04% by weight with reference to the aggregates. Beyond that there is a rapid decrease of this surface tension due to the excessive presence of this agent in the aqueous phase. This limit concentration corresponds to the adsorption of a single layer of the hydrophobation agent, and it is used as the optimal value. In practice, the aggregates are treated with 4 pph (parts per hundred) of an aqueous solution of 1% by weight of this hydrophobation agent.

The hydrophobation agent, however, can also be an alkylamine compound such as a derivative of tallow-dipropylene triamine, or a polyoxyethylenepolyalkyleterphosphate.

2. Producing Formulations of Mixes

The bitumen used is a Viatotal 50/70 bitumen from TOTALFINAELF, acidified by a fatty acid pitch, the cationic emulsion of which, at a concentration of 60% by weight, is done with the emulsifier marketed by CECA under the name Stabiram 730, which is a mixture of alkylamidopolyamines and quaternary ammonium salts (10 kg/ton of emulsion) with hydrochloric acid (5.4 kg/ton of emulsion). Of course, the bitumen can be acidified by other products.

A first formulation 1 was produced with a hot-process mix for reference. A second comparative formulation 2 was produced with the above emulsion without introducing a coalescence agent and film-forming agent, and with the aggregates made hydrophobic as above.

Various additives are then incorporated into the bituminous emulsion in order to obtain, after coating the aggregates in a blender, the following compositions:
  formulation 3: introduction, immediately prior to the coating of the aggregates in the preceding emulsion, of a coalescence agent A composed of C20 to 30 mineral oil with silicone ethoxyl sites, introduced at the rate of 2 pph (parts per 100 parts of aggregates) of a solution at 1.5% by weight;
  formulation 4: introduction of a coalescence agent/film-forming agent pair, comprised of the product A as mentioned above and at the same rate, and as film-forming agent, a compound B, which is an aqueous solution of ethyl polyacrylate, at the rate of 2% by weight with reference to the bitumen;
  formulation 5: introduction of a coalescence agent/film-forming agent pair, comprised of the compound C, an anionic compound of ethoxylated and propyloxylated amines from C12 to C14, at the same rate as the product A, and the product B, at the same rate as before.

The coating of the aggregates is carried out so as to obtain a residual concentration of bitumen of 6.2 pph (parts per 100 parts of aggregates).

Different characteristics of the different formulations of cold-process mixes are measured, to wit:
  the percentage by weight of water lost during compacting, and the percentage by weight of water lost after 24 hours at 20° C., measured during the production of test specimens from mixes according to the DURIEZ test described in the standard NF P 98-251-1;
  the passive adhesive force according to NFT 66 018;
  the compressive strength under different conditions, measured according to the DURIEZ test described in the standard NF P 98-251-1, which specifies a test method the purpose of which is to determine, for a given temperature and compaction, the water content of a hydrocarbonated mix, from the ratio $r_1/R_2$ or I/C of compressive strengths with and without immersion of coated test samples ($r_1$ designating the compressive strength measured after 7 days at 18° C. in water and $R_2$ designating the compressive strength measured after 7 days at 18° C. with 50% relative hydrometry RH).

The results are shown in the following Table.

|  | Formulations | | | | |
| --- | --- | --- | --- | --- | --- |
|  | 1 | 2 | 3 | 4 | 5 |
| Coalescence agent | — | — | A | A | C |
| Film-forming agent | — | — | — | B | B |
| % by weight of water lost during compaction | — | 49 | 65 | 72 | 69 |
| % by weight of water lost after 24 hrs at 20° C. without ventilation | — | 63 | 84 | 80 | 86 |
| Passive adhesiveness per NFT 66 018 | 90 | 90 | 90 | 90 | 90–100 |

-continued

|  | Formulations | | | | |
| --- | --- | --- | --- | --- | --- |
|  | 1 | 2 | 3 | 4 | 5 |
| Compressive strength per NFP 98-251-1 in MPa $R_1$, 1 day at ambient temperature | — | 3.4 | 4.5 | 5.8 | 5.1 |
| $R_2$ 8 days, 7 days of which at 18° C. 50% RH | 8.0 | 6.4 | 7.8 | 8.0 | 7.2 |
| $r_1$ 8 days, 7 days of which at 18° C. in water | 8.0 | 3.3 | 4.8 | 5.9 | 5.8 |
| I/C = $r_1/R_2$ | 1.0 | 0.52 | 0.62 | 0.74 | 0.80 |

By comparing the percentages of water lost during the compacting of the formulations of mixes without the coalescence agent (No. 2) and with this agent (Nos. 3–5), the effectiveness of this additive for the drainage of water from the emulsion is obvious (increase of more than 30% of the weight of water eliminated).

Moreover, it can be seen from the compressive strength values obtained, measured at 1 and 8 days after compaction, that at the mix, the introduction of the hydrophobation agent of the aggregates (formulation 2) makes it possible to obtain values of cohesion that are already appreciable, while with the same emulsion but without hydrophobation of the aggregates, it is not possible to produce test samples to run this test, following an immediate breakdown of the emulsion and caking of the aggregates.

Furthermore, on the one hand the introduction of a coalescence agent, and on the other hand a coalescence agent/film-forming agent pair in the formulations of mixes, has a positive effect on their speed of increase of cohesion, on their final mechanical strength, as well as on their water content (I/C).

In particular it is with the C/B that the best water content of the mix (I/C=0.80) is obtained, which is quite satisfactory compared to the reference hot-process mix (I/C=1) and compared to the value of the NFP 98-130 hot mix standard which gives I/C≧0.75.

These good performances are confirmed by the value of passive adhesiveness according to NFT 66 018, which is 90–100.

The mixes according to the invention have a satisfactory workability, can be stored and handled prior to compacting for a period of at least 24 hours after mixing of the aggregates with a bituminous emulsion, even when using a fast breakdown emulsion of the type used for surface coatings, while mixes produced with the same aggregates untreated lose, upon mixing of the aggregates and the bitumen emulsion, all handling and storage properties after the very quick breakdown of the emulsion, well before compacting.

The invention claimed is:

1. Method for making cold-process bituminous mix, using a bitumen emulsion in aqueous phase and aggregates, wherein prior to mixing the emulsion with said aggregates, said aggregates are treated with an aqueous solution of a hydrophobation agent selected from the group consisting of amino acid compounds, alkylamines, and macromolecular surfactants, said solution consisting essentially of water and said hydrophobation agent.

2. Method according to claim 1, wherein the amino acid compounds are polyalkylamphopolycarboxyglycinates.

3. Method according to claim 1, wherein the amino acid compounds are tallow-amphopolypropylenepolyamines.

4. Method according to claim 1, wherein the alkylamine compounds are alkyl-tallow-polypropylenepolyamines.

5. Method according to claim 1, wherein the hydrophobation agent is used in liquid phase, during the wetting of the aggregates.

6. Method according to claim 1, wherein the bitumen emulsion is produced from natural bitumen selected from the group consisting of pure bitumens, fluxed bitumens, and modified bitumens, and dispersed in aqueous phase with an emulsifying agent.

7. Method according to claim 1, wherein the bitumen emulsion is produced from synthetic binder.

8. Method according to claim 1, wherein the bitumen emulsion comprises between 60% and 70% by weight of bitumen.

9. Method according to claim 1, wherein the bitumen emulsion also comprises a coalescence agent.

10. Method according to claim 9, wherein the coalescence agent comprises a compound selected from the group consisting of ethoxylated and propoxylated $C_{12}$ to $C_{14}$ amines, ethoxylated and propoxylated $C_8$ to $C_2$ alcohols, sodium polyacrylate, glycolic compounds, and antifoaming compounds.

11. Method according to claim 10, wherein the coalescence agent is introduced into the emulsion immediately prior to mixing it with the aggregates.

12. Method according to claim 10, wherein the coalescence agent comprises an antifoaming compound, and the antifoaming compound is a $C_{20}$ to $C_{30}$ mineral oil with ethoxylated silicon sites or a mixture of silicon oil and silica.

13. Method according to claim 1, wherein the bitumen emulsion also comprises a film-forming agent.

14. Method according to claim 13, wherein the film-forming agent comprises an alkyl polyacrylate.

15. Method according to claim 14, wherein the film-forming agent is introduced into the emulsion immediately prior to mixing it with the aggregates.

16. Method according to claim 14, wherein the alkyl polyacrylate is an ethyl polyacrylate.

17. A method of constructing underlays or pavement, comprising producing dense mixes, draining mixes, thin bituminous concretes (BBM), very thin bituminous concretes (BBTM), ultra-thin bituminous concretes (BBUM), or cold-poured mixes from the cold-process bituminous mix obtained by the method according to claim 1.

18. Method for making cold-process bituminous mix, using a bitumen emulsion in aqueous phase and aggregates, wherein prior to mixing the emulsion with said aggregates, said aggregates are treated with at least 0.04% by weight, by reference to the aggregates, of a hydrophobation agent selected from the group consisting of amino acid compounds, alkylamines, and macromolecular surfactants.

19. Method according to claim 18, wherein the amino acid compounds are polyalkylamphopolycarboxyglycinates.

20. Method according to claim 18, wherein the amino acid compounds are tallow-amphopolypropylenepolyamines.

21. Method according to claim 18, wherein the alkylamine compounds are alkyl-tallow-polypropylenepolyamines.

22. Method according to claim 18, wherein the hydrophobation agent is used in liquid phase, during the wetting of the aggregates.

23. Method according to claim 18, wherein the bitumen emulsion is produced from natural bitumen selected from the group consisting of pure bitumens, fluxed bitumens, and modified bitumens, and dispersed in aqueous phase with an emulsifying agent.

24. Method according to claim 18, wherein the bitumen emulsion is produced from synthetic binder.

25. Method according to claim 18, wherein the bitumen emulsion comprises between 60% and 70% by weight of bitumen.

26. Method according to claim 18, wherein the bitumen emulsion also comprises a coalescence agent.

27. Method according to claim 26, wherein the coalescence agent comprises a compound selected from the group consisting of ethoxylated and propoxylated $C_{12}$ to $C_{14}$ amines, ethoxylated and propoxylated $C_8$ to $C_{12}$ alcohols, sodium polyacrylate, glycolic compounds, and antifoaming compounds.

28. Method according to claim 27, wherein the coalescence agent is introduced into the emulsion immediately prior to mixing it with the aggregates.

29. Method according to claim 27, wherein the coalescence agent comprises an antifoaming compound, and the antifoaming compound is a $C_{20}$ to $C_{30}$ mineral oil with ethoxylated silicon sites or a mixture of silicon oil and silica.

30. Method according to claim 18, wherein the bitumen emulsion also comprises a film-forming agent.

31. Method according to claim 30, wherein the film-forming agent comprises an alkyl polyacrylate.

32. Method according to claim 31, wherein the film-forming agent is introduced into the emulsion immediately prior to mixing it with the aggregates.

33. Method according to claim 31, wherein the alkyl polyacrylate is an ethyl polyacrylate.

34. A method of constructing underlays or pavement, comprising producing dense mixes, draining mixes, thin bituminous concretes (BBM), very thin bituminous concretes (BBTM), ultra-thin bituminous concretes (BBUM), or cold-poured mixes from the cold-process bituminous mix obtained by the method according to claim 18.

35. Method for making cold-process bituminous mix, using a bitumen emulsion in aqueous phase and aggregates, wherein prior to mixing the emulsion with said aggregates, said aggregates are treated with a hydrophobation agent, and said hydrophobation agent comprises amino acid compounds.

36. Method according to claim 35, wherein the amino acid compounds are polyalkylamphopolycarboxyglycinates.

37. Method according to claim 35, wherein the amino acid compounds are tallow-amphopolypropylenepolyamines.

38. Method for making cold-process bituminous mix, using a bitumen emulsion in aqueous phase and aggregates, wherein prior to mixing the emulsion with said aggregates, said aggregates are treated with a hydrophobation agent, and said hydrophobation agent comprises a macromolecular surfactant.

39. Method for making cold-process bituminous mix, using a bitumen emulsion in aqueous phase and aggregates, wherein prior to mixing the emulsion with said aggregates, said aggregates are treated with a hydrophobation agent, said hydrophobation agent comprises alkylamine compounds, and said alkylamine compounds are alkyl-tallow-polypropylenepolyamines.

* * * * *